US010529975B2

United States Patent
Song et al.

(10) Patent No.: US 10,529,975 B2
(45) Date of Patent: Jan. 7, 2020

(54) NANOSCALE SOFC ELECTRODE ARCHITECTURE ENGINEERED USING ATOMIC LAYER DEPOSITION

(71) Applicant: West Virginia University, Morgantown, WV (US)

(72) Inventors: Xueyan Song, Morgantown, WV (US); Yun Chen, Morgantown, WV (US); Kirk Gerdes, Morgantown, WV (US); Shiwoo Lee, Morgantown, WV (US)

(73) Assignee: West Virginia University, Morgantown, WV (US)

( * ) Notice: Subject to any disclaimer, the term of this patent is extended or adjusted under 35 U.S.C. 154(b) by 980 days.

(21) Appl. No.: 14/814,881

(22) Filed: Jul. 31, 2015

(65) Prior Publication Data

US 2017/0062799 A1    Mar. 2, 2017

Related U.S. Application Data

(60) Provisional application No. 62/091,693, filed on Dec. 15, 2014.

(51) Int. Cl.
*H01M 4/04* (2006.01)
*H01M 4/86* (2006.01)
(Continued)

(52) U.S. Cl.
CPC ....... *H01M 4/0428* (2013.01); *H01M 4/8626* (2013.01); *H01M 4/8878* (2013.01); *H01M 8/1213* (2013.01); *H01M 8/1246* (2013.01); *H01M 2008/1293* (2013.01); *H01M 2300/0074* (2013.01); *Y02E 60/525* (2013.01); *Y02P 70/56* (2015.11)

(58) Field of Classification Search
CPC ............. H01M 8/1246; H01M 4/0428; H01M 4/8626; H01M 4/8878; H01M 2008/1293; H01M 2300/0074
See application file for complete search history.

(56) References Cited

U.S. PATENT DOCUMENTS

| | | | |
|---|---|---|---|
| 8,026,014 B2 | 9/2011 | Shim | |
| 2009/0011314 A1 | 1/2009 | Chao | |
| 2010/0123993 A1* | 5/2010 | Laor | ................... B01J 37/0238 361/303 |

FOREIGN PATENT DOCUMENTS

CN        101558520 B    12/2012

OTHER PUBLICATIONS

Shim, JH et al., "Atomic layer deposition of thin-film ceramic electrolytes for high-performance fuel cells", Energy and Environmental Science. Published Dec. 2, 2013; pp. 552-575.*

(Continued)

*Primary Examiner* — Jonathan Crepeau
*Assistant Examiner* — Angela J Martin
(74) *Attorney, Agent, or Firm* — Thomas|Horstemeyer, LLP

(57) ABSTRACT

One embodiment includes forming surface-modifying phases on a surface of a functional electrode via atomic layer deposition and controlling the chemistry of constituent phases, the crystalline nature of the constituent phases and the thickness of the surface-modifying phase via the atomic layer deposition such that the thickness is between about 2 nm to about 200 nm. The surface-modifying phases enhances the performance of electrocatalytic activity of the functional electrode and the device.

13 Claims, 14 Drawing Sheets

1. Cathode current collecting layer (primary electronic conductor)
2. Primary electronic conductor
3. Primary ionic conductor
4. Electrolyte (ionic conductor)

(51) Int. Cl.
H01M 4/88 (2006.01)
H01M 8/12 (2016.01)
H01M 8/1213 (2016.01)
H01M 8/1246 (2016.01)
H01M 8/124 (2016.01)

(56) References Cited

OTHER PUBLICATIONS

An, J et al., "Three-dimensional nanostructured bilayer solid oxide fuel cell with 1.3 w/cm2 at 450 degC", Nano Letters. Published Aug. 26, 2013; pp. 4551-4555.*
National Energy Technology Laboratory, Recent Solid Oxide Fuel cell Cathode Studies. U.SI Department of Energy. Published May 9, 2013; online: http://www.netl.doe.gov/File%20Library/Research/Coal/energy%20systems/fuel%20cells/SECA-Fuel-Cell-Cathode-Research-2007-2013.pdf; p. 3, second paragraph; p. 62, second paragraph.*
Ding, D. et al., "Enhancing sofc cathode performance by surface maodification through infiltration." 2014. Energy Environ Sci 7, pp. 552-575.*
Shim et al., Atomic layer deposition of thin-film ceramic electrolytes for high-performance fuel cells, 2013, Journals of Materials Chemistry A, The Royal Society of Chemistry, 1, pp. 12695-12705. (Year: 2013).*
Gong et al., Stabilizing nanostructured solid oxide fuel cell cathode with atomic layer deposition, 2013, Nano Letters, American Chemical Society, 13, pp. 4340-4345. (Year: 2013).*
Ding et al., Enhancing sofc cathode performance by surface modification through infiltration, 2014, Energy & Environmental Science, Royal Society of Chemistry, 7, pp. 552-575. (Year: 2014).*
Minh, Nguyen Q. "Ceramic Fuel Cells", J. Am. Ceram. Soc. 76 (3) 563-688 (1993).
Steele, Brian C.H, et al. "Materials for fuel-cell technologies", Nature 414, 345-352 (2001).
Singhal, S.C. "Solid oxide fuel cells for stationary, mobile, and military applications", Solid State Ionics 152-153, 405-410 (2002).
Liu, Meilin, et al. "Rational SOFC material design: new advances and tools" Materials Today 14 (11), 534-546 (2011).
Pihlatie, M. et al. "Redox Stability of SOFC: Thermal analysis of Ni-YSZ composites", Solid State Ionics 180, 1100-1112 (2009).
Atkinson, A., et al. "Advanced anodes for high-temperature fuel cells" Nature Materials 3, 1-11 (2004).
Wachsman, Eric D., et al. "Lowering the Temperature of Solid Oxide Fuel Cells", Science 334, 935-939 (2011).
Ding, Dong, et al. "Enhancing SOFC cathode performance by surface modification through infiltration", Energy Environ. Sci. 7, 552-575 (2014).
Vohs, John M., et al. "High-Performance SOFC Cathodes Prepared by Infiltration" Adv. Mater 21, 943-956 (2009).
Craciun, R., et al. "A Novel Method for Preparing Anode Cermets for Solid Oxide Fuel Cells" Journal of the Electrochemical Society 146 (11) 4019-4022 (1999).
Kim, H., et al. "Cu—Ni Cermet Anodes for Direct Oxidation of Methane in Solid-Oxide Fuel Cells" Journal of the Electrochemical Society 149 (3) A247-250 (2002).
Gorte, Raymond J., et al. "Anodes for Direct Oxidation of Dry Hydrocarbons in a Solid-Oxide Fuel Cell" Adv. Mater. 12 (19) 1465-1469 (2000).
He, Hongpeng, et al. "Low-Temperature Fabrication of Oxide Composites for Solid-Oxide Fuel Cells" J. Am. Ceram. Soc. 87 (3) 331-336 (2004).
Wang WG, Mogensen M. "High performance lanthanum-ferrite-based cathode for SOFC" Solid State Ionics 2005, 176 (5-6): 457-462.

Lee, Shiwoo, et al. "Pr0.6Sr0.4CoO3-δ electrocatalyst for solid oxide fuel cell cathode introduced via infiltration" Electrochimica Acta 56, 9904-9909 (2011).
Lee, Shiwoo, et al. "Long-term Stability of SOFC Composite Cathode Activated by Electrocatalyst Infiltration" Journal of the Electrochemical Society 159 (7) F301-308 (2012).
Lee, Shiwoo, et al. "Effect of Sr-Doped LaCoO3 and LaZrO3 Infiltration on the Performance of SDC-LSCF Cathode" Journal of the Electrochemical Society 158 (6) B735-742 (2011).
Sata, N., et al. "Mesoscopic fast ion conduction in nanometre-scale planar heterostructures" Nature 408, 946-949 (2000).
Maier, Joachim. "Pushing Nanionics to the Limits: Charge Carrier Chemistry in Extremely Small Systems" Chem. Mater. 26, 348-360 (2014).
An, Jihwan, et al. "Ultra-thin platinum catalytic electrodes fabricated by atomic layer deposition" Phys. Chem. Chem. Phys. 15, 7520-7525 (2013).
Backhaus-Ricoult, M. "Interface chemistry in LSM-YSZ composite SOFC cathodes" Solid State Ionics 177, 2195-2200 (2006).
Adler, Stuart B. "Factors Governing Oxygen Reduction in Solid Oxide Fuel Cell Cathodes" Chem. Rev. 104, 4791-4843 (2004).
Cheng-Chieh, Chao, et al. "Enhanced Oxygen Exchange on Surafce-Engineered Yttria-Stabilized Zirconia" Amer. Chem. Soc. 7 (3) 2186-2191 (2013).
Gong, Yunhui, et al. "Stabilizing Nanostructured Solid Oxide Fuel Cell Cathode with Atomic Layer Deposition" Nano Lett. 13, 4340-4345 (2013).
Gong, Yunhui, et al. "Atomic Layer Deposition Functionalized Composite SOFC Cathode La0.6Sr0.4Fe0.8Co0.2O3-δ-Gd0.2Ce0.8o1.0:Enhanced Long-Term Stability" Chem. Mater. 25, 4224-4231 (2013).
Yu, Anthony S., et al. "Modification of OSFC Cathodes by Atomic Layer Deposition" Journal of the Electrochemical Society 160 (11) F1225-1231 (2013).
Kungas, Rainer, et al. "An Investigation of Oxygen Reduction Kinetics in LSF Electrodes" Journal of the Electrochemical Society 160 (2) F205-211 (2013).
Chao, Cheng-Chieh, et al. "Improved Solid Oxide Fuel Cell Performance with Nanostructured Electrolytes" Amer. Chem. Soc. 5 (7) 5692-5696 (2011).
Miikkulainen, Ville, et al. "Crystallinity of inorganic films grown by atomic layer deposition: Overview and general trends" Journal of Applied Physics 113, 1-101 (2013).
Skarp, Jarmo I., et al. "ALE-reactor for large area depositions" Applied Surface Science 112, 251-254 (1997).
Yamahara, Keiji, et al. "Catalyst-infiltrated supporting cathode for thin-film SOFCs" Solid State Ionics 176, 451-456 (2005).
Search Report in co-pending related PCT App. No. PCT/US15/43551, dated Nov. 4, 2015.
Ding, D. et al. "Enhancing SOFC cathode performance by surface modification through infiltration" Energy & Environmental Science. Published Dec. 2, 2013; pp. 552-575.
Shim, JH et al. "Atomic layer deposition of thin-film ceramic electrolytes for high-performance fuel cells" Journal of Materials Chemistry. Published Jul. 1, 2013; abstract; pp. 12695-12705.
An, J et al. "Three Dimensional Nanostructured Bilayer Solid Oxide Fuel Cell with 1.3 W/cm2 at 450 C" Nano Letters. Published Aug. 26, 2013; pp. 4551-4555.
National Energy Technology Laboratory. "Recent Solid Oxide Fuel Cell Cathode Studies" US Department of Energy. Published May 9, 2013; Retrieved online: http://www.netl.doe.gov/File%20Library/Research/Coal/energy%20systems/fuel%20cells/SECA-Fuel-Cell-Cathode-Research-2007-2013.pdf; pp. 1-3, 58-90.
Zhao, J et al. "Hierarchical functional layers on high-capacity lithium-excess cathodes for superior lithium ion batteries" Journal of Power Sources. Available online Aug. 31, 2013; pp. 95-104.

* cited by examiner

NANOSCALE SOFC ELECTRODE ARCHITECTURE ENGINEERED USING ATOMIC LAYER DEPOSITION

CROSS-REFERENCE TO RELATED APPLICATIONS

This application claims priority to U.S. Provisional Patent Application titled "NANOSCALE SOFC ELECTRODE ARCHITECTURE ENGINEERED USING ATOMIC LAYER DEPOSITION," filed on Dec. 15, 2014 and assigned application No. 62/091,693, which is incorporated by reference herein in its entirety.

STATEMENT REGARDING FEDERALLY SPONSORED RESEARCH OR DEVELOPMENT

This invention was made with government support under agreement DE-FE0004000 and DE-FE0023386 awarded by the National Energy Technology Laboratory, and agreement DE-FC26-05NT42248 awarded by the National Academy of Sciences. The Government has certain rights in the invention.

BACKGROUND

A solid oxide fuel cell (SOFC) has three active components: 1) an electrolyte that is a dense layer which functions as a conductor of oxide ions while preventing the transfer of electrons; 2) a cathode that reduces oxygen into oxide ions by electrons; and 3) an anode where fuel is used to react with oxide ions and give up electrons. The performance of SOFCs can be limited by the effectiveness of the cathode at reducing oxygen, by the rate of oxygen reduction reaction (ORR), and by the transport of the resulting oxide ions to the electrolyte. The structure of the cathode can affect one or more of these mechanisms.

SUMMARY

Included are systems and methods related to surface-modifying phases deposited on functional electrodes via atomic layer deposition (ALD) infiltration. One embodiment of a method, among others, includes a method that comprises forming surface-modifying phases on a surface of a functional electrode via ALD and controlling a chemistry of the surface-modifying phase, a crystalline nature of the surface-modifying phases and thickness of the surface-modifying phase via the ALD, the thickness being controlled to be within a range of about 2 nm to about 200 nm, wherein the surface-modifying phase enhances a performance of electrocatalytic activity of the functional electrodes. The method may further comprise applying one or more thermal treatments to the surface-modifying phase. The surface-modifying phase may comprise at least one of the following: a plurality discrete nano-particles of an ionic conductor, a continuous nano-scale single phase porous ionic conductor network, a nano-scale porous single-phase electrocatalyst, or a nano-composite scaffold. In one non-limiting example, the electrolyte may comprise at least one of pure $ZrO_2$, doped $ZrO_2$, pure $CeO_2$, doped $CeO_2$, pure $LaGaO_3$, doped $LaGaO_3$, pure $Ba_2In_2O_5$, doped $Ba_2In_2O_5$, $BaZrO_3$, or doped $BaZrO_3$. In another non-limiting example, the continuous nano-scale porous single phase ionic conductor network may comprise at least one of: pure $ZrO_2$, doped $ZrO_2$, pure $CeO_2$, doped $CeO_2$, $BaZrO_3$, doped $BaZrO_3$, pure $LaGaO_3$, doped $LaGaO_3$, pure $Ba_2In_2O_5$, or doped $Ba_2In_2O_5$. In another non-limiting example, the continuous nano-scale porous single-phase electrocatalyst may comprise at least one of: cobalt oxide, ferrite, $La_xSr_{1-x}MnO_3$ (LSM), $La_xSr_{1-x}CoO_3$ (LSC), $La_xSr_{1-x}Co_yFe_{1-y}MnO_3$ (LSCF), Pt, Ru Pd, or Pt—Ru alloy. In another non-limiting example, the nano-composite scaffold may comprise a nano-ionic conductor network and a nano catalyst. In another non-limiting example, the nano-composite scaffold may comprise a nano electrocatalyst network and a nano catalyst. In one non-limiting example, the surface modifying phase may comprise a plurality of phases, and forming the surface-modifying phase may further comprise depositing a first surface-modifying phase comprising a plurality of isolated and discrete particles, a porous connected network, and a continuous layer of an electrocatalyst and depositing a second surface-modifying phase comprising an electrolyte over the first surface-modifying phase, wherein the second surface-modifying phase fills in one or more gaps in the first surface-modifying phase. In another non-limiting example, the surface modifying phase may comprise a plurality of phases, and forming the surface-modifying phase may further comprise depositing a first surface-modifying phase comprising an ionic conductor and depositing a second surface-modifying phase over the first surface-modifying phase, the second surface-modifying phase comprising a plurality of isolated and discrete particles of an electrocatalyst. In one non-limiting example, the thickness is between about 2 nm to about 100 nm. In another non-limiting example, the thickness is between about 2 nm to about 40 nm. In another non-limiting example, the thickness is between about 2 nm to about 20 nm. The surface-modifying phase may increase the triple phase boundary density on the surface of the functional electrode.

Another embodiment of a system, among others, includes an electrochemical device that comprises an electrode and one or more surface-modifying layers deposited on a surface of the electrode, wherein the one or more surface-modifying layers are disposed on the surface of the electrode via ALD processing, and having a thickness up to about 200 nm, the one or more surface-modifying layers enhance a performance of electro-catalytic activity of the fuel cell. The one or more surface-modifying layers may comprise at least one of a plurality of isolated and discrete nano-particles of an electrolyte, a nano-scale single phase porous ionic conductor network, a nano-scale porous single-phase electrocatalyst, or a nano-composite scaffold. In one non-limiting example, the thickness is between about 2 nm to about 100 nm. In another non-limiting example, the thickness is between about 2 nm to about 40 nm. In another non-limiting example, the thickness is between about 2 nm to about 20 nm. The one or more surface-modifying layers may increase the triple phase boundary (TPB) density of the electrode.

Other embodiments, systems, methods, features, and advantages of this disclosure will be or will become apparent to one with skill in the art upon examination of the following drawings and detailed description. It is intended that all such additional apparatuses, features, and advantages be included within this description and be within the scope of the present disclosure.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the draw

DETAILED DESCRIPTION

Figure 1:
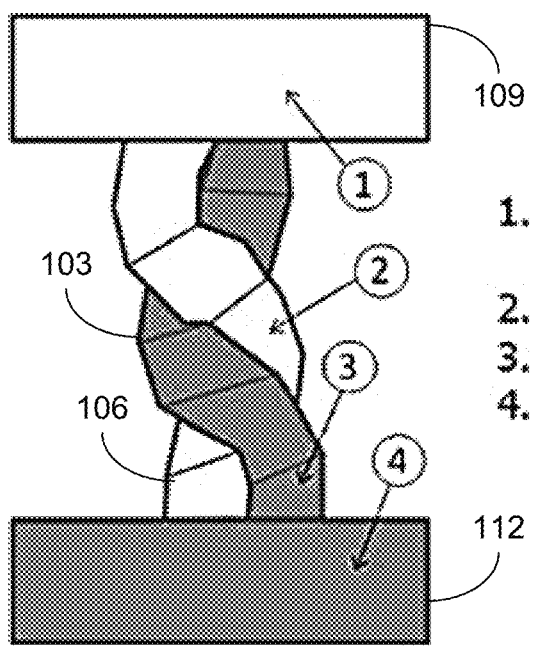
- FIG. 1 is a schematic diagram of a composite structure of a cathode functional layer in accordance with various embodiments of the present disclosure.

Disclosed herein are various examples related to improving performance of an inherently functional electrochemical device, including solid oxide fuel cells (SOFCs), proton exchange membrane fuel cell (PEMFC), flow battery, and secondary batteries. Specifically, the present disclosure relates to methods and systems for controlling a cathode/electrode surface of an inherently functional electrochemical device using Atomic Layer Deposition (ALD) and thermal treatment. Controlling the nanostructure of cathode surfaces can improve cathode transport and reaction kinetics. Reference will now be made in detail to the description of the embodiments as illustrated in the drawings, wherein like reference numbers indicate like parts throughout the several views.

SOFC electrochemically convert chemical energy to electrical energy via a series of solid state electrochemical reactions. The SOFC prevents direct combustion of fuel by separating fuel and oxidant by a gas impermeable solid, which possesses intrinsic properties permitting solid state oxygen conductivity. A SOFC functions by transferring oxygen from some gas source (typically air), through the ionic conducting (but electrically insulating) membrane, and on to the fuel chamber where electrochemical oxidation occurs.

The SOFC cathode is the location at which gaseous oxygen is reduced to oxide ions prior to solid state incorporation and transfer to the SOFC anode (fuel electrode). The oxygen reduction reaction (ORR) process is an electrochemical process occurring by a precisely unknown mechanism, but which is known to require electron transfer. The ORR has a high energy barrier, which is intensified at temperatures below about 800° C. Consequently, irreversible thermodynamic losses called 'overpotential' manifest on the cathode during operation, especially at temperatures below about 750° C. Owing to the high operating temperature, conventional SOFC cathodes degrade through a variety of mechanisms that include (but are not limited to) secondary phase generation and separation, crystallographic distortion and breakdown, and cation segregation.

As disclosed herein, performance of an inherently functional electrochemical device (e.g., SOFC) may be enhanced by applying an electrocatalyst via ALD to the inherently functional electrochemical device. Specifically, the applied electrocatalyst can decrease the activation energy barrier to oxygen exchange in the cathode of the electrochemical device and diminish the rate of performance degradation of the inherently functional electrochemical device. Additionally, according to various embodiments of the present disclosure, the size, thickness, and order of electrocatalyst layers may be controlled for optimum performance.

Conventional methods for improving the performance of SOFC cathodes involve using cathode infiltrations to modify the surface of the cathode to achieve enhancement in activity and stability. Electrode fabrication and modification by infiltration of active components into a porous scaffold can affect electrochemical performance. Solution-based infiltration processes for deposition of both discontinuous (discrete particle) and continuous (dense) coatings of catalysts into the $La_{1-x}Sr_xMnO_3$ (LSM) and $La_xSr_{1-x}Co_yFe_{1-y}O_3$ (LSCF) cathodes are known to enhance the surface electro-catalytic activity and stability. Conventional cathode infiltration can provide about 20-30% power density enhancement on commercial cells. The LSCF and $Sm_2O_3$ doped $CeO_2$ (SDC) composite cathode infiltrated with $La_xSr_{1-x}CoO_3$ (LSC) nanoparticles has shown decreased polarization resistance by 20-30% compared to a baseline cell. Furthermore, the infiltrated and as-received cell may possess similar stability over a 1500 hours testing period, and no differences in electrode polarization resistance degradation rate exist between the as-received cell and the cathode-infiltrated cell over the 1500 hours testing period.

Although conventional solution-based infiltration of electrode/catalyst materials into a cathode scaffold may allow the use of a wide range of catalyst materials, several concerns must be carefully considered, including: (1) introducing the nano-scale electrocatalyst has been very challenging for the SOFCs because of the difficulty of penetration into the active layer, which is ~50 μm below the current collecting layer; (2) the degradation associated with the coarsening and sintering of nano-sized catalyst particles is potentially acute, and the coarsening of the nanoparticles over the high temperature operation and loss of surface area and surface activity are problematic; and (3) manufacturing scale-up of cathode infiltration is challenging, particularly in developing a low cost process with simple processing requirement that remains versatile enough to accept many form features in materials.

The present disclosure relates to modifying the surface of cathodes/anodes of inherently functional electrochemical devices via ALD processing. ALD is a chemical vapor deposition technique that sequentially applies atomic monolayers to a substrate, typically alternating compounds to produce a locally balanced atomic distribution of the target material. ALD is uniquely suitable for depositing uniform and conformal films on complex three-dimensional topographies with high aspect ratio. The indifference of ALD to substrate shape makes it particularly promising for applications to electrochemical devices (e.g., SOFCs) which possess porous active structures with complex three-dimensional topographies, and with electrode performance strictly depending on the surface properties. ALD processing is large batch and features easy scale-up and simplified handling precursors. Such capacity of ALD processing permits the simultaneous processing of hundreds of electrochemical devices (e.g., SOFCs) according to the methods as disclosed herein.

For the application of ALD on commercial inherently functional electrochemical devices (e.g., SOFCs), the types of ALD layer chemistry and crystal structure used are important to ensure both compatibility with the backbone, and stability upon long term cell operation. Described herein are various embodiments regarding the types of materials and methods for tailoring the nanostructure of the surface of cathodes/anodes possessing complex three-dimensional topographies to improve the power density and durability of commercial electrochemical devices, such as, for example, SOFCs. The surface conformal and tailored structures are applied on porous electrochemical device (e.g., SOFC) electrodes using ALD coating and thermal treatment up to about 1000° C. Target electrodes may comprise LSM/Yttria-Stabilized-Zirconia (YSZ) composite electrodes, LSCF/SDC composite electrodes, and/or any other inherently functional electrochemical device electrode architecture. It should be noted that while applications at temperatures of about 600-800° C. are discussed herein, broader operational temperature ranges are acceptable and are within the scope of the embodiments of this disclosure. The technique of applying thin, engineered, conformal surface layers inside the porous electrode structure via ALD is referred to herein as 'ALD infiltration'.

SOFC electrode structure and electrode infiltration will now be discussed to allow the capabilities of ALD infiltration on electrochemical devices (e.g., SOFC) be distinguished from the capabilities of conventional infiltration methods. While a two-phase cathode is used as the representative example in the discussion, a single phase cathode can also be used as a backbone. A two-phase composite composed of an ionic conductor and an electronic conductor (or a mixed ionic-electronic conductor, MIEC) is widely accepted as an electrode functional layer structure by commercial SOFC manufacturers. A composite electrode structure possesses a high population of three phase boundaries (TPB) because the ionic conducting phase effectively extends the electrolyte towards the cathode. The TPB is a physical location where the electrolyte, air and electrode meet. The TPB is a geometrical parameter that correlates strongly to the performance of fuel cells.

Referring to FIG. 1, shown is a schematic diagram depicting an example of the composite structure of a cathode functional layer. In the example of FIG. 1, the composite structure includes a primary ionic conductor 103 and primary electronic conductor 106 extending between a cathode current collecting layer 109 and an electrolyte 112. A primary ionic conducting phase (or conductor) 103 is the phase classification that includes pure ionic conductors (e.g., yttria-stabilized zirconia, YSZ, etc.) and mixed ionic-electronic conductors, which have a predominant ionic conductivity compared to the electronic conductivity (e.g., doped cerium (IV) oxide, $CeO_2$, etc.). A primary electronic conducting phase (or conductor) 106 is the phase classification that includes electronic conductors (e.g., metals, etc.) and a mixed ionic-electronic conductor, which has a predominant electronic conductivity compared to ionic conductivity (etc., lanthanum strontium cobalt ferrite (LSCF), lanthanum strontium manganite (LSM), lanthanum strontium cobaltite (LSC), etc.).

The baseline cell may be fashioned from a variety of materials. For example, a commercially available anode-supported button cell from MSRI (Materials and Systems Research, Inc. Salt Lake City, Utah) can be used as a baseline cell. The MSRI cell includes a LSM cathode current collecting layer 109 (e.g., about 50 μm in thickness), a LSM/YSZ cathode active layer (e.g., about 10 μm), a YSZ electrolyte (e.g., about 10 μm), a Ni/YSZ anode active layer (e.g., about 10 μm), and a Ni/YSZ current collecting anode (e.g., about 700 μm). However, the baseline cell is not limited to cells made by specific manufacturers or to the particular materials cited above.

Figure 2:
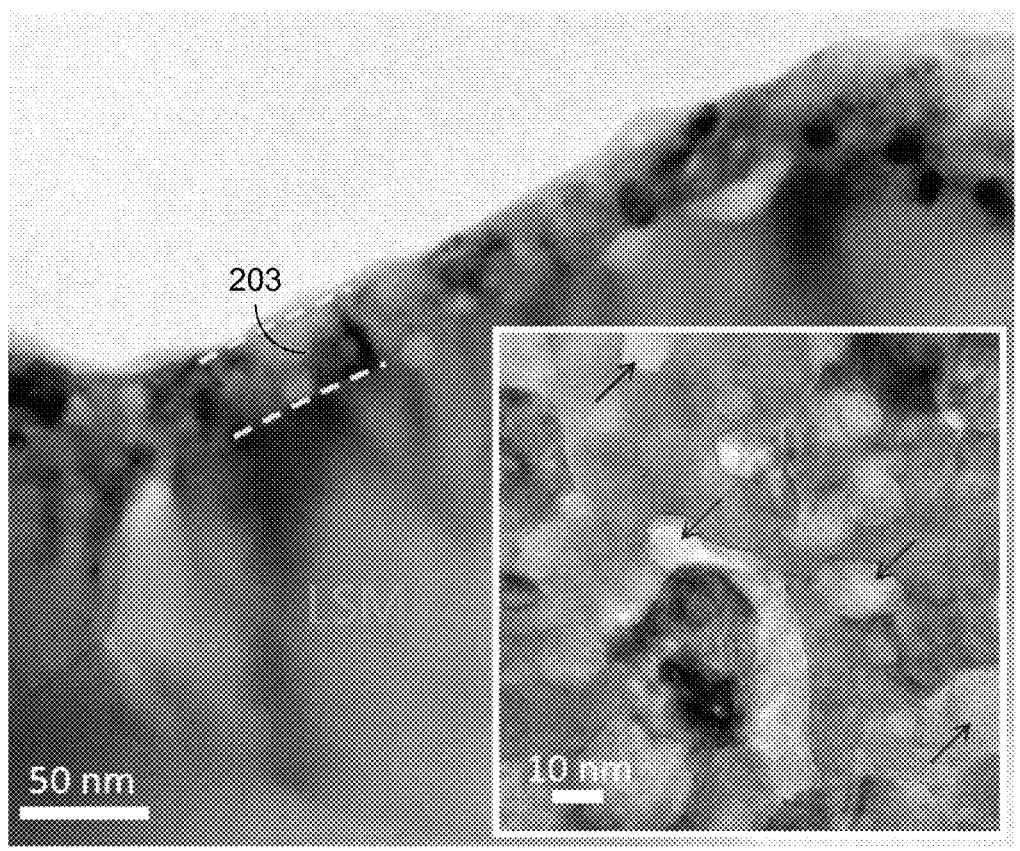
FIG. 2 is an example of a surface-modifying phase/layer applied on a surface of a cathode backbone in accordance with various embodiments of the present disclosure.

Referring next to FIG. 2, shown is an example of a surface-modifying phase/layer 203 (e.g., (electro) catalytic phase/layer) applied on the surface of the scaffold according to various embodiments of the present disclosure. FIG. 2 illustrates an example of a cross-section view of the surface-modifying phase 203 (e.g., porous nanoionics network $ZrO_2$ layer) on a LSM/YSZ backbone. FIG. 2 further illustrates an example of a plan-view of nano-grained and porous $ZrO_2$ surface layer.

The surface-modifying phase 203 can affect activation-polarization resistance and performance stability of the backbone, and directly impact electrode processes and cell responses (e.g., thermal evolution, cell overpotential, electrode degradation, etc.) that are controlled by these properties. According to various embodiments of the present disclosure, a composite cathode may be formed by modifying an existing multi-phase scaffold with a surface-modifying layer/phase 203 that is electrochemically active. The microstructure of the composite cathode critically affects electrochemical performance and can be manipulated by controlling surface chemistry (e.g., size, order, thickness, etc.) of the materials.

The surface-modifying (electro) phase/layer 203 may be ionically conductive (e.g., $ZrO_2$, doped $ZrO_2$, $CeO_2$, doped $CeO_2$), electronically conductive (e.g., LSM, Pt), or mixed ionic-electronic conductive (e.g., LSCF, $La_{1-x}Sr_xCoO_3$ (LSC), $Pr_{1-x}Sr_xMnO_3$ (PSC), etc.). In some embodiments, the surface-modifying phase 203 can also be categorized by crystallographic structure, which is related with electronic defect chemistry affecting charge transfer process, ionic diffusion, or molecular incorporation processes at surfaces. For example, the surface-modifying phase 203 may comprise a multi-component oxide selected from perovskite structure (e.g., LSC, PSC, $Ba_{1-x}Sr_xCo_yFe_{1-y}O_{3-\delta}$ (BSCF), etc.) or perovskite-related structure including $K_2NiF_4$ (e.g., $(La_{1-x}Sr_x)_2CoO_4$ (LSCo214), $(Pr_{1-x}Sr_x)_2CoO_4$ etc.). In other embodiments, the surface-modifying phase 203 may comprise precious metal doped perovskite or perovskite-related structures with high catalytic activity and good structural stability.

Various embodiments of the present disclosure relate to a method of controlling material deposition to produce a continuous, conformal electrode surface coating of engineered structure and deposit into a porous network of an electrode of an inherently functional electrochemical device (e.g., SOFC). As such, the electrochemical activity and/or degradation rate of the electrode may be controlled. Fabrication and formation of the nano-scale network on the surface of the electrode engenders enhanced power density for operation throughout the entire electrochemical device operation temperature of about 600-800° C., according to various embodiments of the present disclosure. The formation of the nano-scale network on the surface may also increase the durability of the cell for long term operation.

According to various embodiments of the present disclosure, a nano-scale network produced via ALD infiltration may comprise: (1) isolated and discrete nano-particles of electrolytes on the surface of the electrode that mechanically increase the triple phase boundary density; (2) a continuous nano-scale porous single phase ionic conductor network (including nanoionic network) that is conformal to the host electrode architecture and possesses controllable thickness on the surface of electrode backbones; (3) a continuous nano-scale porous single-phase electrocatalyst that is conformal and with controllable thickness on the surface of electrode backbone; (4) a continuous nano-composite scaffold comprising a nano-ionic conductor network and nano-catalyst that is conformal and with controllable thickness on the surface of the electrode backbones; and (5) a conformal nano-composite scaffold comprising a nano electrocatalyst network and different kind of nano-catalyst, with controllable thickness, proportion of different phase. The electrode to which the surface-modifying phase/layer 203 is applied may comprise a cathode and/or an anode.

In some embodiments, among others, the surface-modifying phase/layer 203 may comprise a single phase ionic conductor network to enhance the electro-catalytic activity and cell durability of inherently functional electrochemical devices. The network may comprise an electrolyte, such as, for example pure or doped $ZrO_2$, $CeO_2$, and/or any other suitable type of electrolyte. The network is porous having a thickness and crystal size in the range of about 2-200 nm.

Multiple ALD processing parameters can be used to produce the single ionic conductor network depending on the type of ALD systems used (thermal ALD or plasma enhanced ALD) and the oxidant (e.g., water or other oxidant gases) to achieve amorphous or crystalline $ZrO_2$, for example, on the electrode surface. In one non-limiting example, the selected reactant and reacting conditions may comprise Tetraki-(dimethylamino) zirconium (IV) and deionized water. With respect to the processing parameters, the electrochemical device may be preheated to about 200-300° C. and the Zr precursor may be preheated to about 80° C. while no preheating is needed for $H_2O$. Next, gases of the Zr precursor and the oxidizer $H_2O$ can be alternatively pulse-introduced into the reaction chamber. The purge is necessary between each exposure processing in order to remove the extra reactants and the by-products. Multiple ALD cycles (e.g., about 30-90) may be performed to build up a 30-40 nm amorphous state $ZrO_2$ ALD layer.

In other embodiments, among others, the surface-modifying phase/layer 203 may comprise a conformal nano-scale porous network of highly active electrocatalyst, with controllable thickness through the processing, on the surface of the electrode backbones (e.g., SOFC electrode backbones). In one non-limiting example, the surface-modifying phase/layer 203 may comprises a continuous, porous and nano-grained $Co_3O_4$ network. In other non-limiting examples, the electrocatalyst may comprise LSM, LSC, LSCF, Pt, Ru, Pd, and/or any other suitable type of electrocatalyst. The network is porous having a thickness and crystal size in the range of about 2-200 nm.

Multiple ALD processing parameters may also be used to produce the electrocatalyst depending on the type of ALD systems used (thermal ALD or plasma enhanced ALD) and the oxidant (e.g., water or other oxidant gases) on the electrode surface. In one non-limiting example, assume that surface-modifying phase 203 comprises a Pt electrocatalyst. The selected reactant and reacting conditions may comprise (trimethyl) methylcyclopentadienylplatinum (IV) and deionized water, and the stage could be heated to about 250-350° C. Multiple ALD cycles (e.g., about 70-150) may be performed to achieve about 5 nm Pt layer.

In other embodiments, among others, the surface-modifying phase/layer 203 may comprise a nano-scale network including a continuous nano-composite scaffold comprising a ionic conductor network (including nanoionic network) and nano-catalyst that is conformal and with controllable thickness on the surface of an electrode backbone of an electrochemical device. The network may comprise an electrolyte, such as, for example, pure or doped $ZrO_2$, $CeO_2$, and/or other suitable electrolyte, and a catalyst comprising a ceramic or metallic catalyst, such as, for example LSM, LSC, LSCF, Mn, Fe, Co, Ni, Cu, Ru, Rh, Pd, Ba, Ir, Pt, and/or other suitable ceramic and/or metallic catalyst.

According to various embodiments, a method of producing the nano-scale network with respect to the continuous nano-composite scaffold may comprise forming the ionic conductor (e.g., $ZrO_2$), and then with or without subsequent heat-treatment, inserting nano-crystals (e.g., Pt) into the porous region of the ionic conductor network using ALD processing. In some embodiments, among others, the nano-crystal catalyst can be formed using ALD and the nano-catalyst can be topped using the ionic conductor via subsequent ALD processing. As appreciated to one of ordinary skill in the art, a wide range of ALD processing parameters can be used to produce the single ionic conductor network depending on the type of ALD systems used (e.g., thermal ALD, plasma enhanced ALD). The oxidant (e.g., water or other oxidant gases) can be used to achieve amorphous or crystalline ionic conductors on the cathode surface.

According to other embodiments, the network may comprise a conformal nano-composite scaffold comprising nano-electrocatalyst network and various kinds of nano-catalyst, with controllable thickness, proportion of different phase, through the ALD processing. The network and filling catalyst may comprise LSM, LSC, LSCF, Pt, Pd, and/or any other suitable electrocatalyst. It should be further noted that in addition to a YSZ/Pt composite surface scaffold, alternative composites can include SDC/Pt, SDC/Pd composite surface scaffold, $Co_3O_4$/Pt, $Co_3O_4$/Pd composite surface scaffold, SDC/$Co_3O_4$ composite surface scaffold, LSM/Pt, LSM/Pd composite surface scaffold, LSC/Pt, LSC/Pd composite surface scaffold, and/or any other suitable composite surface scaffold.

As discussed herein, the formation of the designed nano-architecture on the surface of SOFC cathode can be achieved through precise control of ALD parameters and subsequent heat-treatment steps to form the engineered nano-architecture and surface scaffold. In some embodiments, fabrication and formation of the nano-scale network on the surface of LSM/YSZ and LSCF/SDC cathodes, for example, can achieve about 20-100% greater power density of cells for commercial operation throughout the entire SOFC operation temperature of about 600-800° C. The formation of the nano-scale network on the surface of electrodes (e.g., LSM/YSZ and LSCF/SDC cathodes) will also increase the durability of the cell for long term operation.

The embodiments of the present disclosure may employ a mature, commercially relevant electrolyte, electrocatalyst, and/or noble metal materials set. Such materials are fully compatible with the commercial fuel cells.

As previously discussed, the surface-modifying phase/layer 203 may comprise isolated and discrete nano-particles of electrolyte applied on the surface of an electrode and can mechanically induce increases in the triple phase boundary density according to various embodiments of the present disclosure. In other embodiments, among others, the surface-modifying phase/layer 203 may comprise a conformal nano-scale single phase porous ionic conductor network applied on the surface of an electrode to enhance the electro-catalytic activity and cell durability of inherently functional cells within the conventional thermal operating range.

On the cathode side, the electrode reactions principally occur at the three phase boundary (TPB) line contacting electronic and ionic conductors and gas phases. In principle, the TPB line can have a finite width when one of the electrode components has mixed electronic and ionic conductivity. Because of the limited width of the TPB, mechanically increasing the TPB density by introducing nano-scale feature improves the performance of the electrochemical device.

In a proof of concept experiment, a pure $ZrO_2$ layer was deposited by ALD within an inherently functional LSM/YSZ cathode of a commercial, inherently functional (anode supported) fuel cell. The as-deposited state of the $ZrO_2$ was amorphous and a conformal surface layer was formed on the LSM/YSZ cathode backbone. By controlling the ALD coating cycles, a uniform layer with thickness of 20 and 40 nm was deposited on the cathode of two cells, respectively. Both cells were subjected to heat treatment to crystallize the $ZrO_2$ structure before cell operation. An electrochemical test was performed at 750° C. in $H_2$ and air. In comparison with a baseline cell, a power density increase was observed for the cell with ALD-coated $ZrO_2$, as shown in Table 1.

The cell possessing a 40 nm $ZrO_2$ layer performed better than that possessing the 20 nm $ZrO_2$ layer, as shown in FIG. 2. TEM imaging reveals a surface layer of tetragonal $ZrO_2$ nanograins (20-30 nm) that develops from the 40 nm coating. FIG. 2 clearly shows a porous $ZrO_2$ scaffold structure formed on the LSM backbone grains. The $ZrO_2$ layer possesses the thickness comparable to the crystal grain size, with neighboring $ZrO_2$ grains connected to each other, and features with ~15 nm mesopores randomly distributed among the nano-$ZrO_2$ grains.

Figure 3A:
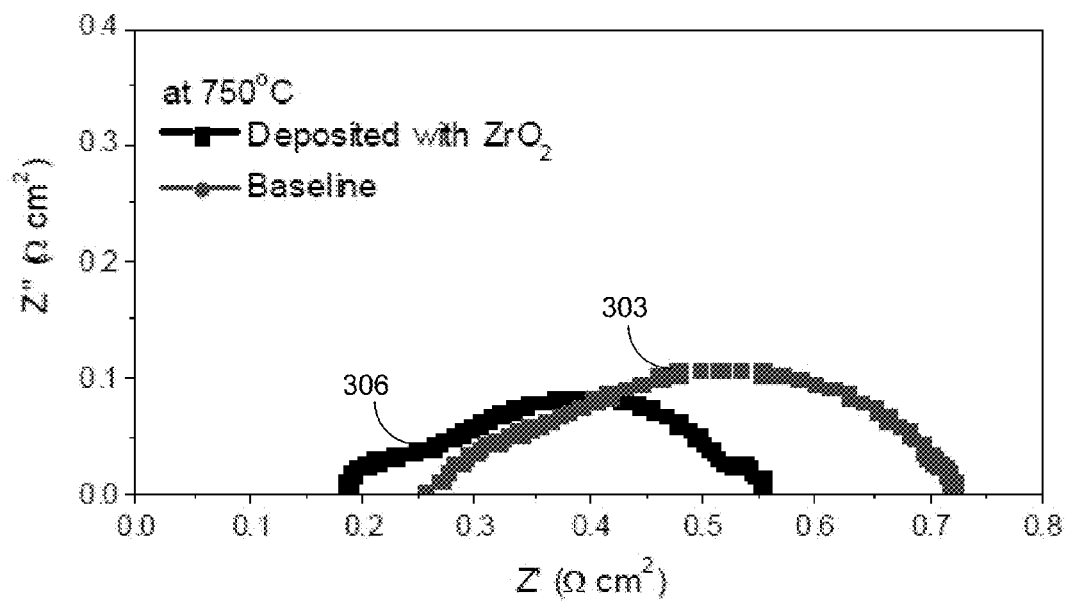
FIGS. 3A and 3B are plots illustrating examples of resistance decrease between $ZrO_2$ deposited cells with a baseline cell in accordance with various embodiments of the present disclosure.
Figure 3B:
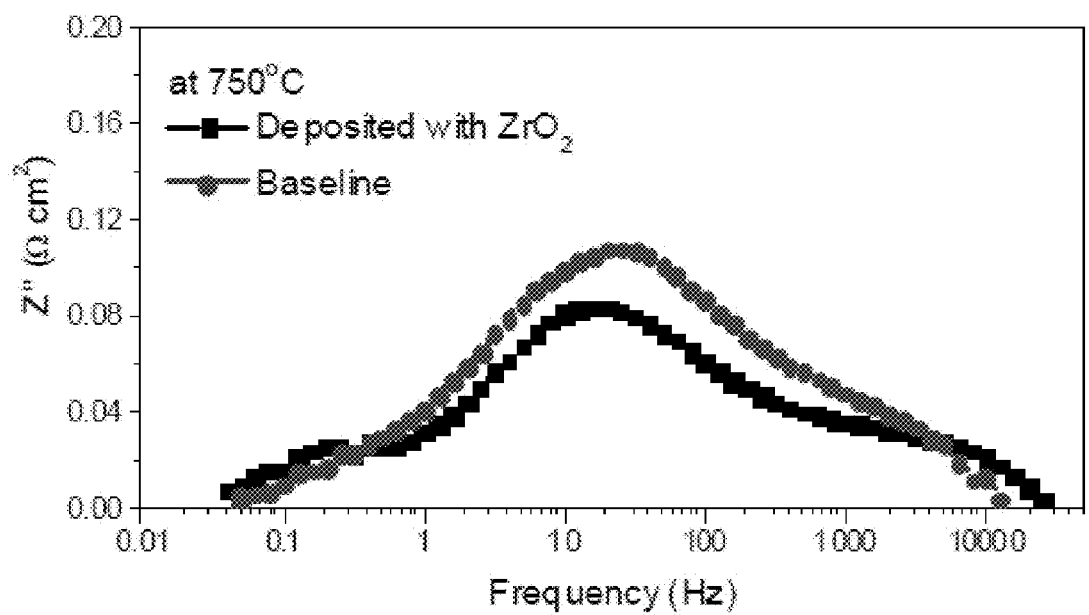

FIG. 2 depicts the resulting porous $ZrO_2$ scaffold structure formed on the LSM backbone grains. The $ZrO_2$ layer possesses the thickness comparable to the crystal grain size, with neighboring $ZrO_2$ grains connected to each other, and features with ~15 nm pores randomly distributed among the nano-$ZrO_2$ grains. An electrochemical test was performed at about 750° C. in humidified $H_2$ and air. In comparison with the baseline cell 303, a resistance decrease was observed for the ALD-coated $ZrO_2$ cell 306, as shown in FIGS. 3A and 3B. This is further illustrated in Table 2.

TABLE 2

Power Densities for Cell with Deposited $ZrO_2$

| Operating Temperature (° C.) | Terminal voltage (V) | Baseline 303 P (W/cm$^2$) | $ZrO_2$ deposited 306 P (W/cm$^2$) | Factor of enhancement |
|---|---|---|---|---|
| 800 | 0.8 | 0.35 | 0.5 | 1.43 |
|  | 0.5 | 0.54 | 0.8 | 1.48 |
| 750 | 0.8 | 0.25 | 0.37 | 1.48 |
|  | 0.5 | 0.39 | 0.58 | 1.5 |
| 700 | 0.8 | 0.21 | 0.27 | 1.29 |
|  | 0.5 | 0.33 | 0.45 | 1.36 |
| 650 | 0.8 | 0.14 | 0.17 | 1.2 |
|  | 0.5 | 0.22 | 0.29 | 1.32 |

Significant performance enhancement, by a factor of about 1.3-1.5, was achieved through the entire SOFC operation temperature range of about 600-800° C. at both low and high overpotential.

Since no Y dopants were introduced to increase oxygen vacancies, the enhanced cell performance is attributable to the engineered structure, as disclosed herein. Specifically, an increased density of TPBs was obtained by forming the nano-porous $ZrO_2$ network on the LSM surface and the enhanced ionic conductivity at the $ZrO_2$ grain boundaries from the surface coating layer. The results are consistent with FIG. 4, which illustrates parallel ionic conductivity of films with different periods as described in "Mesoscopic fast

TABLE 1

Power Densities for Cell with Deposited $ZrO_2$ and/or Pt

Figure 4:
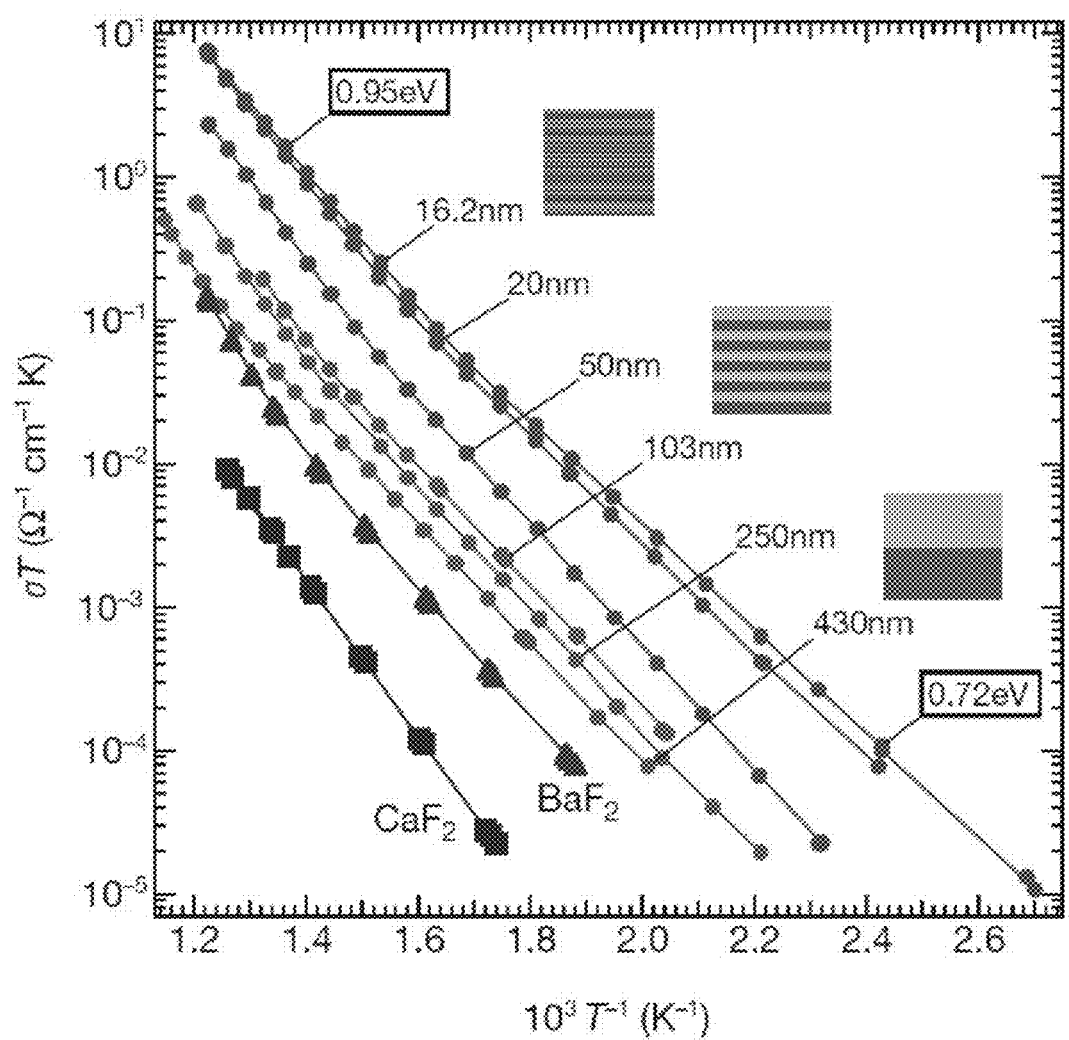
FIG. 4 is a plot illustrating examples of parallel ionic conductivity of films with various periods and interfacial densities.

| Cathode backbone surface modifications | $R_{total}$ (Ω/cm$^2$) @0.3 A/cm$^2$ | $R_s$ (Ω/cm$^2$) @0.3 A/cm$^2$ | $R_p$ (Ω/cm$^2$) @0.3 A/cm$^2$ | i (A/cm$^2$) @0.8 V | P (W/cm$^2$) @0.8 V | P enhanced from baseline | i (A/cm$^2$) @0.5 V | P (W/cm$^2$) @0.5 V | P enhanced from baseline |
|---|---|---|---|---|---|---|---|---|---|
| Baseline | 0.761 | 0.235 | 0.526 | 0.315 | 0.252 | / | 0.789 | 0.398 | / |
| 20 nm $ZrO_2$ | 0.682 | 0.274 | 0.407 | 0.375 | 0.3 | 1.2 | 0.933 | 0.467 | 1.17 |
| 40 nm $ZrO_2$ | 0.55 | 0.185 | 0.365 | 0.47 | 0.376 | 1.49 | 1.125 | 0.562 | 1.41 |
| 5 nm Pt | 0.618 | 0.245 | 0.373 | 0.433 | 0.346 | 1.39 | 1.113 | 0.562 | 1.41 |
| 5 nm Pt/40 nm $ZrO_2$ | 0.586 | 0.239 | 0.347 | 0.478 | 0.382 | 1.53 | 1.068 | 0.54 | 1.36 |
| 20 nm $ZrO_2$/HT/5 nm Pt | 0.566 | 0.247 | 0.319 | 0.475 | 0.38 | 1.51 | 1.129 | 0.565 | 1.42 |
| 40 nm $ZrO_2$/HT/5 nm Pt | 0.544 | 0.289 | 0.255 | 0.508 | 0.406 | 1.61 | 1.225 | 0.613 | 1.54 | ion-conduction in nano-scale planar heterostructures" by N. Sata, K. Eberman, K. Eberl, & J. Maier (Nature, 2000), the entirety of which is hereby incorporated by reference. The results are further consistent with the features described in "Pushing Nanoionics to the Limits: Charge Carrier Chemistry in Extremely Small Systems" by J. Maier (*Chemistry of Materials*, 26(1), pp. 348-360, 2014), the entirety of which is hereby incorporated by reference. It is stated that ionic conductivity in solid electrolytes can be improved by dissolving appropriate impurities into the structure or by introducing interfaces that cause the redistribution of ions in the space-charge region. Furthermore, the ionic conductivity increased linearly with the increase of the grain boundary/interface density as shown in FIG. 4. This is fully consistent with the results from the inventors depicted in FIGS. 3A and 3B showing the significant decrease of both series resistance $R_s$ and polarization $R_p$ of the cell, resulted from the nano-grained ionic conductor $ZrO_2$ network on the surface of LSM/YSZ. This result contrasts with solution-based infiltrating of discrete nano-particles that principally affect polarization $R_p$. In addition, the cell possessing the 40 nm coating performs better than the cell with 20 nm coating, caused by the compromise between the triple phase boundary (TPB) density and connectivity for ionic conducting $ZrO_2$ grains on the surface layer. The low resistance from the cathode with the 40 nm coating is probably caused by the higher density of the effective TPB that is actually functioning as a result of $ZrO_2$ grains on the LSM surface being connected to each other. The effective TPB density may actually be smaller for the cathode with 20 nm coating than for 40 nm coating, even though the total TPB density was larger, because of a lack of connectivity between the $ZrO_2$ grains on LSM surfaces.

Figure 5:
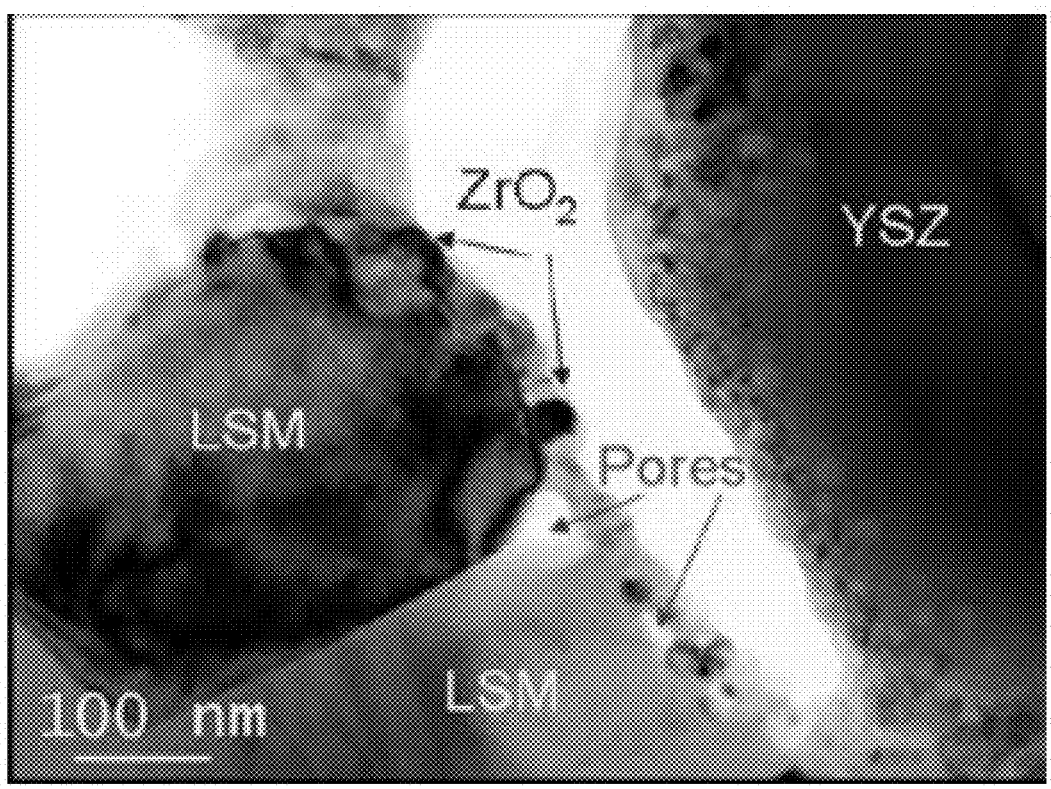
FIG. 5 illustrates an example of nano-grains of $ZrO_2$ on a cathode backbone after about 500 hours of operation in accordance with various embodiments of the present disclosure.

FIG. 5 illustrates nano-grains of $ZrO_2$ on the LSM and YSZ after about 500 hours of operation. As shown in FIG. 5, the ALD nano-grain layers appear to be absolutely stable, retaining the nano-grain architecture features and maintaining grain size of about 20-30 nm on LSM.

In other embodiments of the present disclosure, the surface-modifying phase/layer 203 may comprise a porous nano-grained YSZ network, with Pt catalyst on the surface of LSM/YSZ composite cathodes of commercial cells. Adding catalytic precious metal materials with the goal of increasing oxygen dissociation and uptake could improve the performance. The performance enhancement through precious metal infiltrated into cathode backbones is mostly attributed to improvement in the high surface area catalytic activity over the oxygen reaction reduction. However, studies on the effect of adding a precious metal catalyst to enhance oxygen dissociation and absorption have shown mixed results. While some reports indicate that infiltration of Pt and Pd benefit the performance of LSM/YSZ composite cathodes, at least one study has reported that neither Pt nor Pd has any effect on the performance of LSM cathodes.

According to various embodiments of the present disclosure, the surface-modifying phase/layer 203 may modify the performance of any electrochemical device possessing an active electroceramic electrode, including but not limited to, solid oxide electrolysis cells, molten carbonate fuel cells, phosphoric acid fuel cells, conventional or advanced electrochemical cells (batteries), conventional or advanced flow batteries, and metal/metal-oxide flow batteries.

In other embodiments, the surface-modifying phase/layer 203 may modify the performance of any electrochemical device possessing an active metal electrode, including but not limited to solid oxide electrolysis cells, molten carbonate fuel cells, phosphoric acid fuel cells, conventional or advanced electrochemical cells (batteries), conventional or advanced flow batteries, and metal/metal-oxide flow batteries.

In some embodiments, among others, the surface-modifying phase/layer 203 applied via ALD may be used as an infiltrate suitable for application of electro-catalytically active materials into the porous structure of SOFC cathodes for the purpose of enhancing the electrochemical activity.

In other embodiments, among others, the surface-modifying phase/layer 203 applied via ALD may be used as an infiltrate suitable for application of electro-catalytically active materials into the porous structure of SOFC cathodes for the purpose of enhancing the resistance of the cell to thermodynamically induced degradation of active electrode components.

In other embodiments, among others, the surface-modifying phase/layer 203 applied via ALD can be used as an infiltrate suitable for application of electro-catalytically active materials into the porous structure of SOFC cathodes for the purpose of enhancing the resistance of the cell to thermodynamically induced degradation arising from inactive and electrode-intrinsic materials.

In other embodiments, among others, the surface-modifying phase/layer 203 applied via ALD can be used as an infiltrate suitable for application of electro-catalytically active materials into the porous structure of SOFC cathodes for the purpose of enhancing the resistance of the cell to thermodynamically induced degradation arising from electrode-extrinsic materials.

Various embodiments of the present disclosure will be beneficial for nano-materials application in other fields in addition to SOFC. Pinning the nano-particle size and site has been one of the hurdles for the application of nano-materials especially for high temperature application including catalysts of various kinds and thermoelectric applications.

In various embodiments of the present disclosure, the surface-modifying phase/layer 203 may be deposited to suppress electrode evolution (microstructural, morphological, or chemical) that manifests as degradation of cell performance over periods of time exceeding 1 hour. Degradation includes any departure of the microstructure, morphology, crystallography, chemistry, or combinations thereof from the designed, engineered, intended, or as-fabricated electrode. Cell performance is characterized by cell voltage, cell current, cell power, cell resistance or electrode resistivity or area specific resistance, electrochemical impedance analysis, cyclic voltammetry, or other conventional electrochemical techniques.

In other embodiments of the present disclosure, the surface-modifying phase/layer 203 may be deposited to enhance electrode resistance to degradation associated with extrinsically sourced materials (contaminants and impurities). Examples of impurities include but are not limited to $CO_2$, $H_2O$, chrome and chrome-containing molecules, ammonia, hydrocarbons/organics, volatile and solid metals and compounds, and volatile and solid metalloids and compounds.

In other embodiments of the present disclosure, among others, the surface-modifying phase/layer 203 may be deposited to enhance the electrode's resistance to degradation associated with intrinsically sourced materials, including pre-cursor impurities. Examples of impurities include but are not limited to Zr, Y, La, Sr, Co, Fe, Ba, Na, Si, and combinations thereof.

Effect of Pt Catalyst Addition on Cathode Performance

Figure 6A:
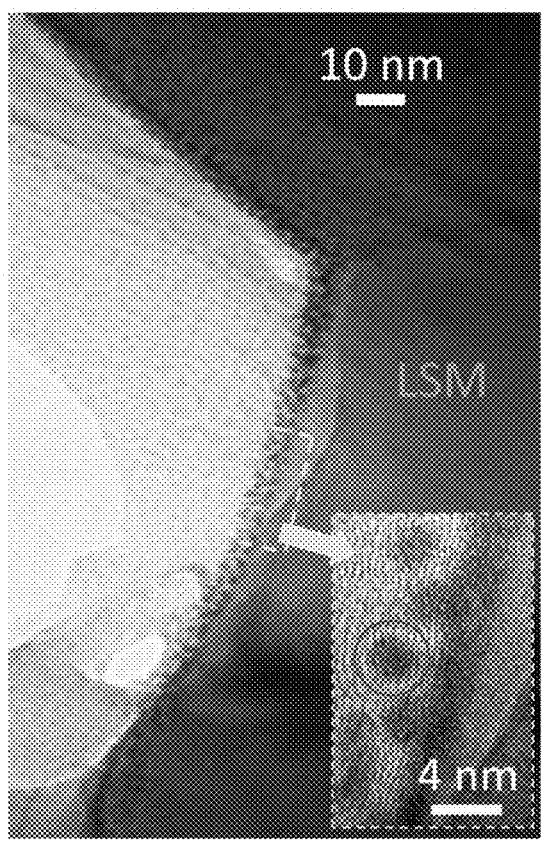
FIG. 6A illustrates examples of Pt as-deposited on a cathode backbone in accordance to various embodiments of the present disclosure.
Figure 6B:
FIG. 6B illustrates examples of Pt on a cathode backbone, after cell operation, in accordance to various embodiments of the present disclosure
Figure 7:
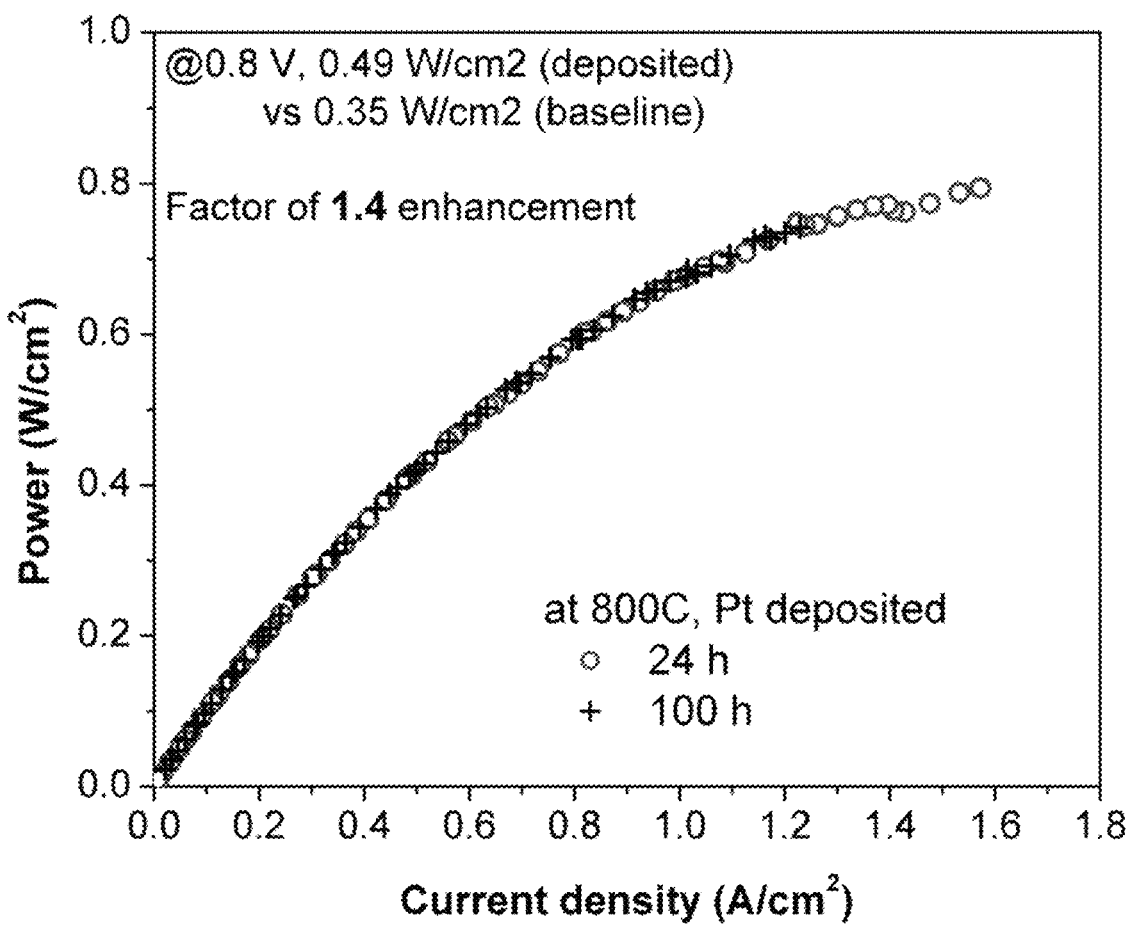
FIG. 7 is a plot illustrating examples of performance improvements of the cells of FIGS. 6A-6B in accordance with various embodiments of the present disclosure.

To test the effect of Pt catalyst addition on the cathode performance, Pt was deposited on the surface of the LSM/YSZ surface using ALD. Pt is considered an excellent catalyst for ORR enhancement, and so was added by ALD to further increase oxygen dissociation and uptake to improve the cathode performance. FIG. 6A illustrates as-deposited Pt particles as crystalline and discrete, with ~2 nm diameter, and a total layer thickness ~7 nm. For the SOFC cathode, as-deposited Pt layer possessing nano-grains and large surface area is a suitable catalyst for cathode of SOFCs. The Pt ALD deposited button cell was operated at about 800° C., and the performance, with the factor of about 1.4, indicated attractive enhancement (see FIG. 7). TEM analysis was carried out on the same cell that is operated and electrochemically characterized. FIG. 6B illustrates the TEM image from the cell operated for about 200 hours. The ALD layer of discrete ~2 nm Pt particles evolved to become sparsely distributed discrete Pt particles of ~70 nm diameter. The diminishing effectiveness of the Pt nano-particles and the loss of the activation site for the catalyst is obvious. Since the improved performance is stable (FIG. 7) and no power degradation was observed after 100 hours of operation at 0.6 A/cm$^2$, implying no further evolution (or decay) of the ALD architecture upon cell operation, the large Pt particles shown in FIG. 6B were formed during the heating process before the cell operation. Nevertheless, an obvious cell power density enhancement (factor of about 1.4) is achieved. The results imply the opportunity to further improve the cell performance by stabilizing the nano Pt particles.

The unique architectural character of each as-deposited ALD layer offers an opportunity to engineer architecture by leveraging the thermodynamically controlled characteristics of the constituent phases. Specifically, it is possible to pin Pt particles to the cathode surface using stable $ZrO_2$ nano-crystal matrices. The strategy is to retain the active electro-catalytic structure (therefore Oxygen Reaction Reduction (ORR) activity) even when the system is subjected to aggressive driving potentials (temperatures and electrical field).

Figure 8A:
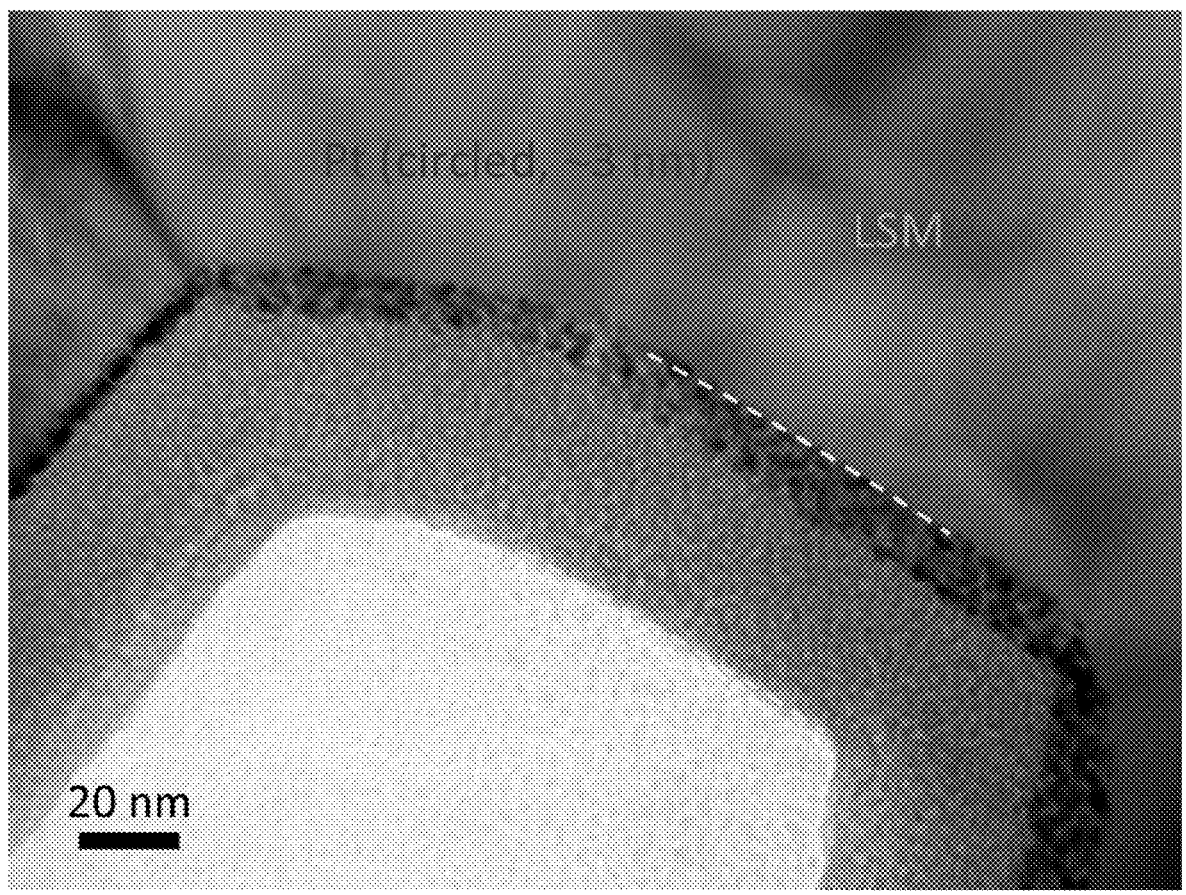
FIGS. 8A, 8B, and 8C illustrate examples of a dual deposited surface-modifying phase applied on a surface cathode, where the dual deposited surface-modifying phase includes Pt particles and an amorphous $ZrO_2$ layer in accordance with various embodiments of the present disclosure.
Figure 8B:
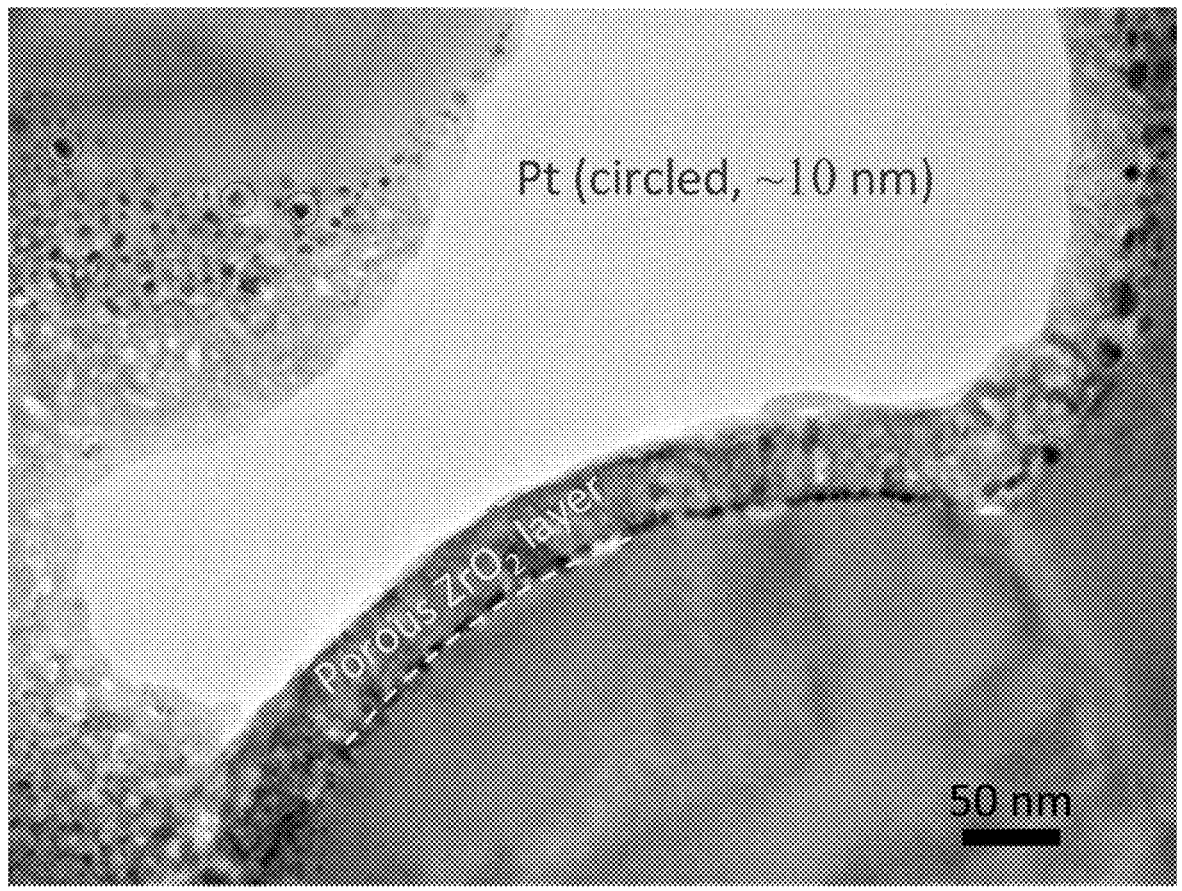
Figure 8C:
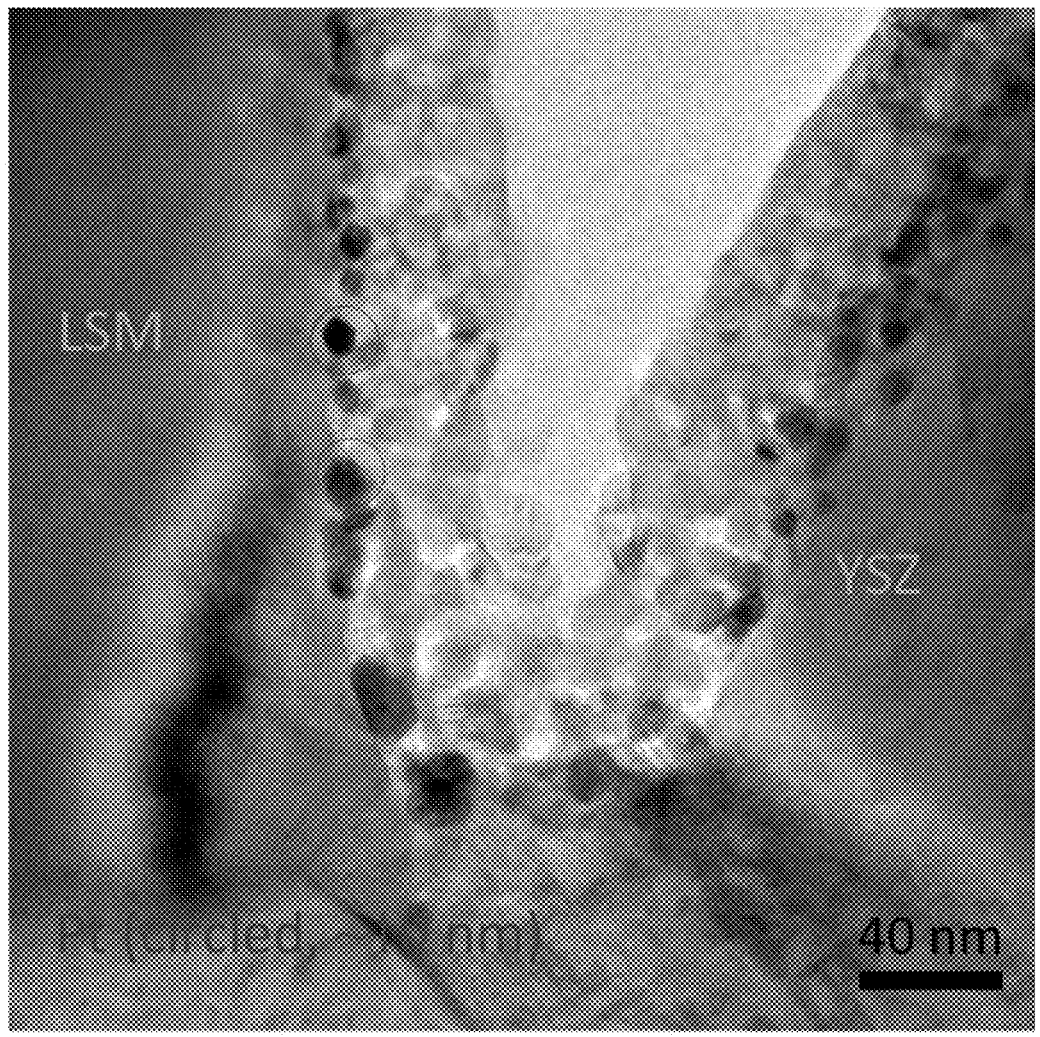

One approach for adding the Pt catalyst via ALD may comprise filling the gap between as-deposited Pt particles which can prevent Pt particle growth. For example, a two-phase coating of amorphous $ZrO_2$ on the as-deposited Pt can be successfully applied. FIGS. 8A-C illustrate examples of the Pt particles and the amorphous $ZrO_2$ layer according to various embodiments of the present disclosure. Specifically, FIG. 8A illustrates the $ZrO_2$ coating layer at about 40 nm in thickness. The nature of as-deposited $ZrO_2$ is amorphous, therefore the gap between neighboring Pt crystals is fully filled with $ZrO_2$.

Figure 9:
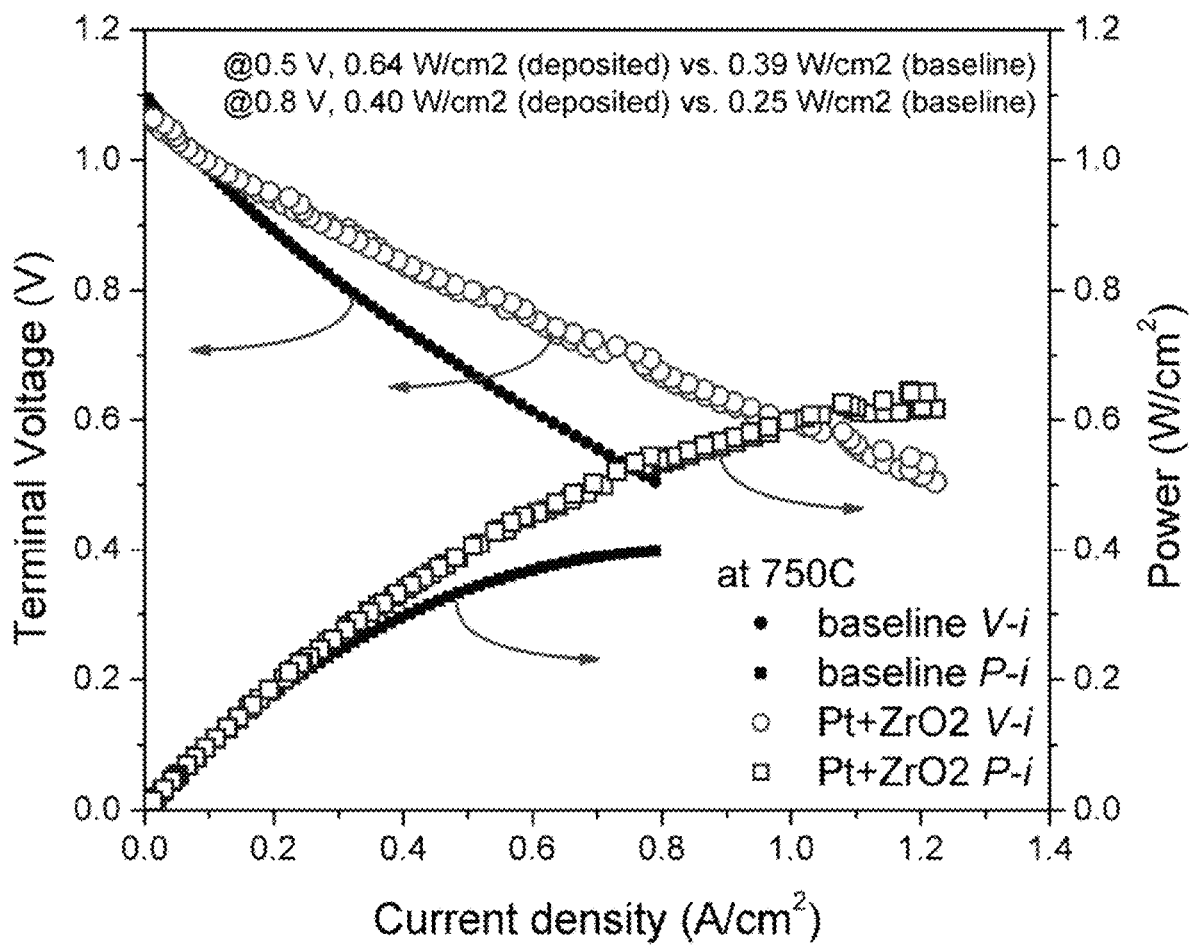
FIG. 9 is a plot illustrating examples of performance improvements of the cells of FIGS. 8A-8C in accordance with various embodiments of the present disclosure.

The layered structure, with superjacent amorphous $ZrO_2$ and subjacent crystalline Pt may be subjected to heat-treatment. FIG. 8B illustrates that heat-treatment generated the nano-composite architecture with a porous crystalline $ZrO_2$ layer covering the discrete Pt particles. Accordingly, the amorphous $ZrO_2$ conformal layer turned into a continuous crystalline $ZrO_2$ layer covering the entire backbone of the cathode. The layered $ZrO_2$ architecture contains mesopores that preserve the gas pathway and disrupt agglomeration of the discrete Pt particles of ~5-7 nm that were fully pinned to the backbone surface. The Pt grain growth and agglomeration are successfully interrupted by applied $ZrO_2$ amorphous and the subsequent formation of $ZrO_2$ crystal grains. The engineered architecture depicted in FIG. 8C results in a performance enhancement of commercial button cells by a factor of greater than 1.6. FIG. 9 illustrates the performance of the dual-deposited (Pt, $ZrO_2$). Specifically, FIG. 9 illustrates a performance enhancement of about 1.6 as compared to a performance enhancement of about 1.4 for an only Pt deposited cell and a performance enhancement of about 1.43 for only $ZrO_2$ deposited cell.

Another approach for adding a Pt catalyst via ALD may comprise pre-formation of nano-cages for pinning Pt in the porous scaffold (e.g. $ZrO_2$). Because the porous structure in the $ZrO_2$ layer is formed after the heat-treatment, PIs also successfully infiltrated Pt particles into the pore region of the $ZrO_2$ porous layer. Cells with both 20 and 40 nm deposited $ZrO_2$ layers were subjected to one thermal treatment and subsequent ALD processing for Pt deposition. As listed in Table 1A, performance enhancements of 1.5 and 1.6 were achieved for the cells with 20 and 40 nm, respectively.

Figure 10A:
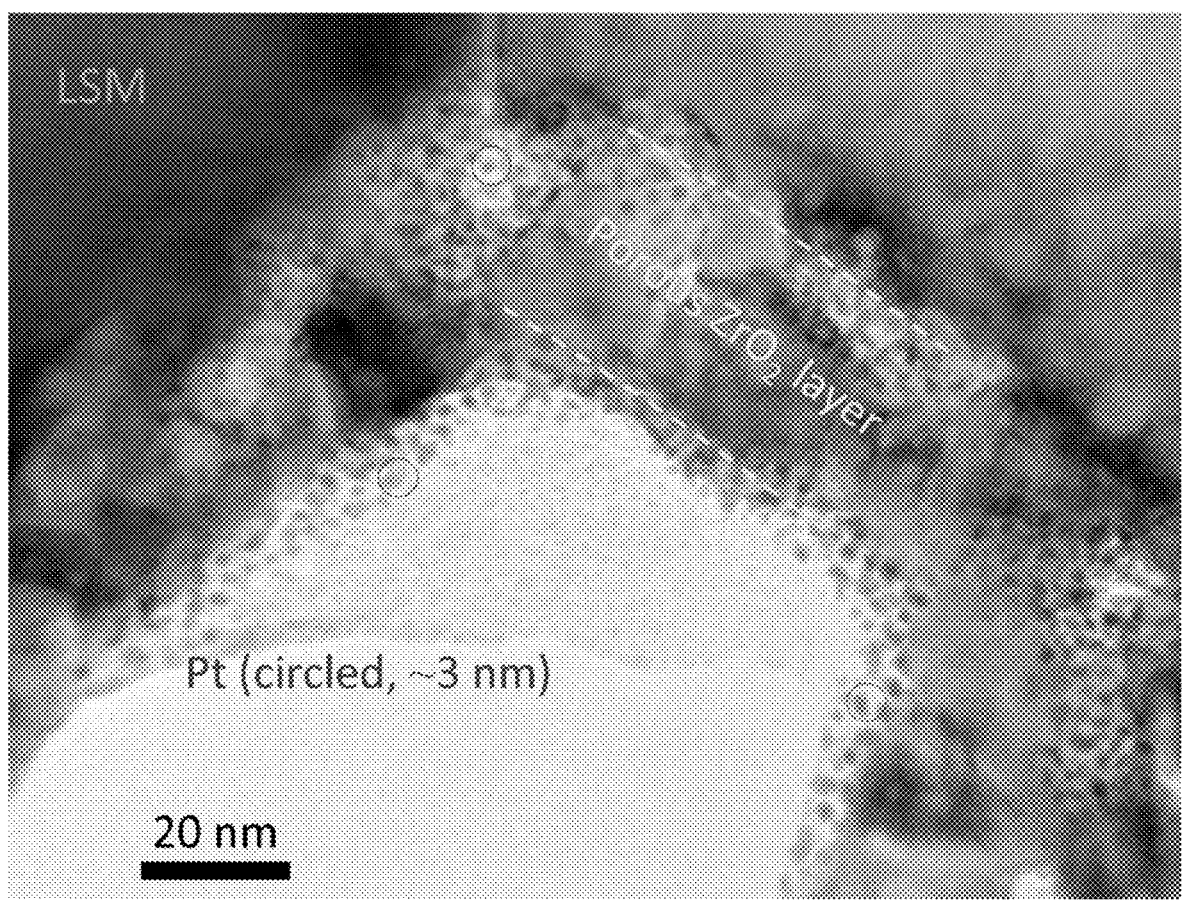
FIGS. 10A and 10B illustrate examples of a dual deposited surface-modifying phase applied on a surface cathode, where the dual deposited surface-modifying phase includes Pt particles deposited into $ZrO_2$ grains layer (nano-ionic network) in accordance with various embodiments of the present disclosure.
Figure 10B:
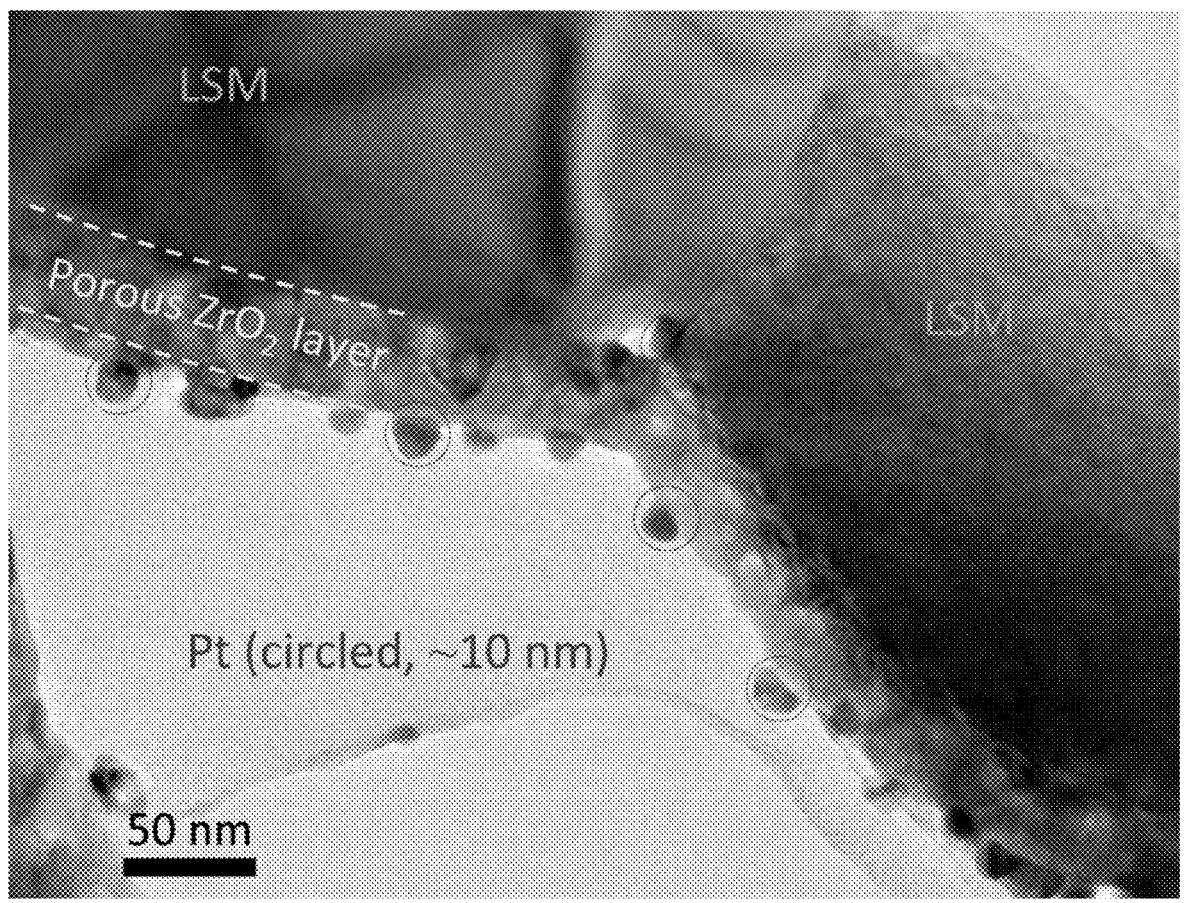

As shown in FIG. 10A, the original pore regions within the ALD $ZrO_2$ layer are decorated by the ~2 nm Pt crystallites. After thermal treatment, the Pt particles possess dimension of approximately ~7 nm, and are distributed on $ZrO_2$ surface and inside the original pore regions within the ALD $ZrO_2$ layer, as depicted in FIG. 10B. Comparison of the structure depicted in FIG. 10B with FIG. 6B reveals that surface structural engineering prevents evolution of Pt particle diameter from 7 nm to 70 nm and preserves electrocatalytic activity. The engineered structure stabilized the Pt structure, which is necessary to enhance the electrode activity.

Figure 11:
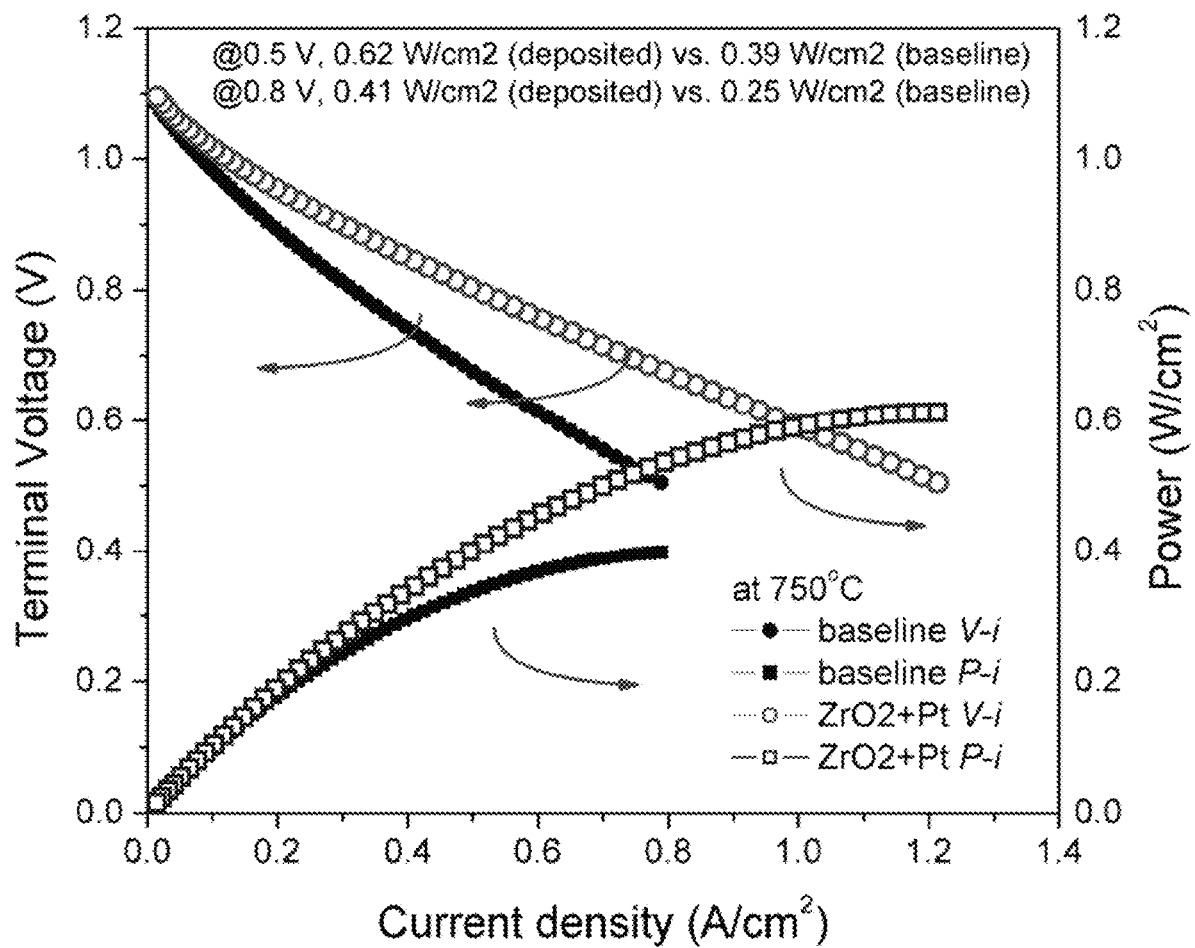
FIG. 11 is a plot illustrating examples of comparison of performance improvements of the cells of FIGS. 10A-10B in accordance with various embodiments of the present disclosure.

The engineered architecture depicted in FIGS. 10A-10B illustrates a performance enhancement of an inherently functional SOFC by a factor of >1.64. FIG. 11 illustrates the performance of the cell with the architecture depicted in FIGS. 10A and 10B. The performance shows a factor of about 1.64 enhancement as compared with about 1.4 for only Pt deposited cell and a performance factor of about 1.43 for an only $ZrO_2$ deposited cell.

As disclosed by various embodiments, the establishment of a nano-grained porous ionic conductor surface network (including nanoionic network) enhances the ionic conductivity and operational performance of commercial SOFC. The enhancement is facilitated by the increase of TPB density on the cathode, and most importantly by the ionic conductivity of nano-grained surface layer on cathode backbone. By forming a nano-composite with minute Pt nano-catalyst loading to facilitate ORR activity, the observed performance enhancement is attributed to improvement in the high surface area catalytic activity. Furthermore, the nano-grained surface ionic conductor layer on LSM provides local ionic transport pathways, thus the overall oxygen surface exchange and transport kinetics on the cathode surface were significantly improved. These experiments contribute to validation of the nanoionic mechanisms reported by independent researchers and offer justification for tailoring the ionic conductivity via nanostructural engineering with ALD and thermo-treatment.

ALD is simple, scalable, and uniquely suitable for depositing uniform and conformal films on SOFCs that are having complex three-dimensional topographies with high aspect ratio, and with the performance strictly rely on the active reaction area on the electrode surface. ALD is very versatile processing and there are multiple ALD parameters, within wide ranges, that could be adjusted to achieve the same product, as illustrated in FIGS. 2, 3A-3B, 5, 6A-6B, 7, 8A-8C, 9, 10A-10B, and 11. The testing disclosed herein was completed under commercially relevant conditions of temperature (700-800° C.), and in the presence of representative electrical current densities, and potential gradients. The nano-ionic network was stabilized for operations lasting over 500 hours. The engineered nano-structure enabled lower temperature cell operation, and engineered cells operated at 750° C. with approximately 17% higher power density than the baseline cell operating at 800° C. Tuning the dopant distribution in the ionic conductor layer, the layer thickness, the particle size, and the distribution of the Pt catalyst may further improve cell performance.

Commercially available, anode supported, SOFC button cells fabricated by Materials and Systems Research, Inc. (MSRI, Salt Lake City, Utah) were employed for all the experiments described herein. MSRI button cells are composed of five layers as follows, starting from the anode: ~0.9 mm thick Ni/YSZ cermet layer which supports the cell structure; 15 μm thick Ni/YSZ active layer; ~12 μm thick YSZ electrolyte; ~15 μm thick $La_{0.8}Sr_{0.2}MnO_3$ (LSM)/YSZ active layer; and 50 μm thick, pure LSM current collecting layer. The cell active area (limited by the cathode) is 2 $cm^2$. The exposure area of the anode to fuel is about 3.5 $cm^2$. Total 7 cells from the same batch of the commercial cells were subsequently processed and studied and their performance was listed in Table 1.

All ALD processes used in experiments disclosed herein were performed on a Savannah 200 Atomic Layer Deposition system. The Tetrakis(dimethylamino)zirconium(IV), (99% STREM CHEMICALS, INC), the (trimethyl)methylcyclopentadienylplatinum(IV), (99%, STREM CHEMICALS, INC) and deionized water were used as Zr precursor, Pt precursor and oxidant, respectively. During the processing of growing a Zr—O amorphous layer, the sample stage was firstly pre-heated to about 260° C., and then about 45 (or about 70 ALD) cycles were performed to build up a 20 nm (or about 40 nm) layer. Similarly, for growing a 5 nm Pt layer, a processing with about 100 ALD cycles was performed on the pre-heated sample stage (310° C.).

SOFC button cells were tested on a test stand. Gold mesh/nickel paste and platinum mesh/platinum paste were used for anode and cathode lead connections, respectively. 100% $H_2$ was used as fuel. The fuel and air stream flow rates were controlled separately using mass flow controllers. Cell testing was performed at about 750° C. and about 800° C. During the operation, a 400 L/min air flow rate and a 400 mL/min fuel flow rate were used. All samples were loaded at a constant current of about 0.3 $A/cm^2$ for desired periods. The cell performance and impedance spectra were examined using a potentiostat/galcanostat (Solartron 1470E) equipped with a frequency response analyzer (Solartron 1455A).

ALD coated cells were sectioned and subjected to nano-structural and crystallographic examination using Transmission Electron Microscopy (TEM). All the TEM examinations were conducted in the cathode active layer. TEM samples were prepared by mechanical polishing and ion milling in a liquid-nitrogen cooled holder. Electron diffraction, diffraction contrast and HRTEM imaging were performed using a JEM-2100 operated at 200 kV. Chemical analysis was carried out under TEM using energy dispersive X-ray Spectroscopy (EDS).

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A method, comprising:
    forming a surface-modifying phase on a surface of a functional electrode via atomic layer deposition;
    controlling the chemistry of the surface modifying phase, the crystalline nature of the surface modifying phase and thickness of the surface-modifying phase via the atomic layer deposition, the thickness being controlled to be within a range of about 2 nm to about 200 nm;
    establishing a nano-grained porous ionic conductor surface network on the surface of the functional electrode which increases a triple phase boundary density of the functional electrode; and
    wherein the surface-modifying phase enhances a performance of electrocatalytic activity of the functional electrode.

2. The method of claim 1, further comprising applying one or more thermal treatments to the surface-modifying phase.

3. The method of claim 1, wherein the surface-modifying phase comprises at least one of: (1) a plurality of discrete nano-particles of an ionic conductor, (2) a plurality of discrete nano-particles of an electrocatalyst, (3) a continuous nano-scale porous single phase ionic conductor network, (4) a continuous nano-scale porous single-phase electrocatalyst, or (5) a nano-composite scaffold composed of multiple phases selected from the above (1)-(4).

4. The method of claim 3, wherein the ionic conductors may comprise at least one of: pure $ZrO_2$, doped $ZrO_2$, pure $CeO_2$, doped $CeO_2$, pure $LaGaO_3$, doped $LaGaO_3$, pure $Ba_2In_2O_5$, doped $Ba_2In_2O_5$, $BaZrO_3$, or doped $BaZrO_3$.

5. The method of claim 3, wherein the continuous nano-scale porous single phase ionic conductor network may comprise at least one of: pure $ZrO_2$, doped $ZrO_2$, pure $CeO_2$, doped $CeO_2$, $BaZrO_3$, doped $BaZrO_3$, pure $LaGaO_3$, doped $LaGaO_3$, pure $Ba_2In_2O_5$, or doped $Ba_2In_2O_5$.

6. The method of claim 3, wherein discrete nano-particles of an electrocatalyst may comprise at least one of: cobalt oxide, ferrite, $La_xSr_{1-x}MnO_3$ (LSM), $La_xSr_{1-x}CoO_3$ (LSC), $La_xSr_{1-x}Co_yFe_{1-y}MnO_3$ (LSCF), Pt, Ru Pd, or Pt—Ru alloy.

7. The method of claim 3, wherein the nano-composite scaffold comprises a nano-ionic conductor network and a nano catalyst.

8. The method of claim 3, wherein the nano-composite scaffold comprises a nano electrocatalyst network and a nano catalyst.

9. The method of claim 1, wherein the surface modifying phase comprises a plurality of phases, and wherein forming the surface-modifying phase further comprises:
    depositing a first surface-modifying phase comprising a plurality of isolated and discrete particles, a porous connected network, and a continuous layer of an electrocatalyst; and
    depositing a second surface-modifying phase comprising an electrolyte over the first surface-modifying phase, wherein the second surface-modifying phase fills in one or more gaps in the first surface-modifying phase.

10. The method of claim 1, wherein the surface modifying phase comprises a plurality of phases, and wherein forming the surface-modifying phase further comprises:
    depositing a first surface-modifying phase comprising an ionic conductor; and
    depositing a second surface-modifying phase over the first surface-modifying phase, the second surface-modifying phase comprising a plurality of isolated and discrete particles of an electrocatalyst.

11. The method of claim 1, wherein the thickness is between about 2 nm to about 100 nm.

12. The method of claim 1, wherein the thickness is between about 2 nm to about 40 nm.

13. The method of claim 1, wherein the thickness is between about 2 nm to about 20 nm.

\* \* \* \* \*